United States Patent [19]
Boyd

[11] Patent Number: 4,959,541
[45] Date of Patent: Sep. 25, 1990

[54] METHOD FOR DETERMINING APERTURE SHAPE

[75] Inventor: David W. Boyd, Greeley, Colo.

[73] Assignee: Hewlett-Packard Company, Palo Alto, Calif.

[21] Appl. No.: 389,033

[22] Filed: Aug. 3, 1989

[51] Int. Cl.[5] .............................................. H04N 1/10
[52] U.S. Cl. ................................. 250/237 R; 250/216; 250/208.1
[58] Field of Search ................. 250/237 R, 208.1, 216, 250/235–236; 355/71; 358/494

[56] References Cited

U.S. PATENT DOCUMENTS

| 4,495,422 | 1/1985 | Wiggins | 250/237 R |
| 4,644,159 | 2/1987 | Miura | 250/208.1 |
| 4,709,144 | 11/1987 | Vincent . | |
| 4,870,268 | 11/1989 | Vincent . | |
| 4,926,041 | 5/1990 | Boyd . | |

OTHER PUBLICATIONS

*Advanced Engineering Mathematics*, 3rd Ed., of Erwin Kreyszig, pub. by John Wiley & Sons, Inc., of New York, NY, Lib. of Congress Cat. No. 71-172951, Sections 18.5 (pp. 653–661) and 18.11 (pp. 681–683).
"Fitting Curves to Data," by Marco S. Caceci & William P. Cacheris of Florida State University, Byte Magazine,m May 1984 Ed., pp. 340–362.

*Primary Examiner*—Edward P. Westin

[57] ABSTRACT

A mathematical method for selecting the shape for an occluding aperture which is to be positioned at a predetermined aperture location in a light path extending between an illuminated line object and a linear photosensor array. Through use of the aperture selected according to the method, a light intensity measurement is obtained across the linear photosensor array which is uniformly proportional to the light intensity across the illuminated line object.

10 Claims, 6 Drawing Sheets

METHOD FOR DETERMINING APERTURE SHAPE

BACKGROUND OF THE INVENTION

The present invention relates generally to line-focus systems and, more particularly, to a method for constructing a compensating aperture for a line-focus system which enables accurate measurement of light intensity.

Line-focus systems are utilized in optical scanners and other optical imaging devices. In a line-focus system, a light beam from an illuminated line object is imaged by a lens onto a linear photosensor array which is positioned remotely from the line object. The linear photosensor array is a single-dimension array of photoelements which correspond to small area locations on the line object. These small area locations on the line object are commonly referred to as "picture elements" or "pixels." In response to light from its corresponding pixel location on the line object, each photosensor produces a data signal which is representative of the light intensity which it experiences. All of the photoelement data signals are received and processed by an appropriate data processing system. In an optical scanning device, the illuminated line object of the line-focus system is commonly referred to as a "scan line."

Optical scanners and various components thereof are disclosed in U.S. Pat. No. 4,926,041; U.S. Pat. No. 4,709,144 of Kent J. Vincent; and U.S. Pat. No. 4,870,268, which are all hereby specifically incorporated by reference for all that is disclosed therein.

A problem experienced in most line-focus systems is that the light intensity of the line image produced at the linear photosensor array is not uniformly proportional to the light intensity at the line object. Generally, if a line object is evenly illuminated across its length, the light intensity at the sensor is much brighter in the area corresponding to the center of the line object than in the areas corresponding to the ends of the line object. This effect is quite significant; the intensity at the line image center may be roughly twice the intensity as that at the ends. There are several different optical effects which produce this problem. These optical effects are due mainly to the different distances of the various points on the line object from the central axis of the lens.

It is known in the prior art relating to line-focus systems to utilize an aperture positioned in the light path between a line object and a photosensor to differentially occlude light in the light path extending between the line object and the photosensor. Such "occluding" or "compensating" apertures are designed to occlude a proportionally greater portion of the light at the center of the light path than at the ends so as to make the light intensity at the photosensor uniformly proportional to the light intensity at the line object. A problem with the construction of such occluding apertures is that there is no mathematical formula which may be employed in a straightforward manner to determine aperture shape. As a result, such occluding apertures have, prior to the present invention, been created through trial-and-error empirical methods.

OBJECTS OF THE INVENTION

It is an object of the present invention to provide a method for producing an occluding aperture for a line-focus system which produces a light intensity at a linear photosensor array which is uniformly proportional to the light intensity at a line object.

It is another object of the present invention to provide a method for constructing an occluding aperture for a line-focus system which employs mathematical modeling of the line-focus system.

It is another object of the present invention to provide a method for constructing an occluding aperture for a line-focus system which enables construction of an aperture for any point along the light path of the line-focus system.

It is another object of the present invention to provide a method for constructing an occluding aperture for a line-focus system which requires a single empirical measurement of light intensity at the system photosensor.

SUMMARY OF THE INVENTION

The present invention comprises a method for selecting the shape for an occluding aperture which is to be positioned at a predetermined aperture location in a light path extending between an illuminated line object and a linear photosensor array. Through use of the aperture selected according to the method, a light intensity measurement is obtained across the linear photosensor array which is uniformly proportional to the light intensity across the illuminated line object.

Initially, a constant light intensity is provided across the illuminated line object and the resulting light intensity, with no aperture present in the light path, is measured at the linear photosensor array. Next, a constant value, target light intensity which is to be achieved through use of the aperture is selected. The selected target light intensity is preferably equal to approximately the lowest light intensity value associated with the illuminated line object which was measured across the linear photosensor array.

Next, an initial aperture shape 23 is selected and is represented mathematically. A mathematical model for light intensity at any point across the linear photosensor array is then constructed. The mathematical model assumes an aperture of the selected shape in place at the predetermined aperture location and assumes a light intensity at the line object equal to that produced at line object for the initial light intensity measurement at the photosensor.

Next, using the measured light intensity across the photosensor array and the mathematical model, the light intensity across the photosensor array with the selected aperture shape in place is computed.

Next, during a selected number of iterations, the mathematical expression for aperture shape in the mathematical model for light intensity is manipulated in an orderly fashion which is adapted to minimize the total deviation of the computed light intensity across the linear photosensor array from the constant value, target light intensity.

Finally, a design aperture shape is selected in accordance with the particular manipulated mathematical expression for aperture shape which produces the least total deviation in computed light intensity from the constant value, target light intensity.

BRIEF DESCRIPTION OF THE DRAWINGS

An illustrative and presently preferred embodiment of the invention is shown in the accompanying drawings in which.

DETAILED DESCRIPTION OF THE INVENTION

The Invention in General

Figure 1:
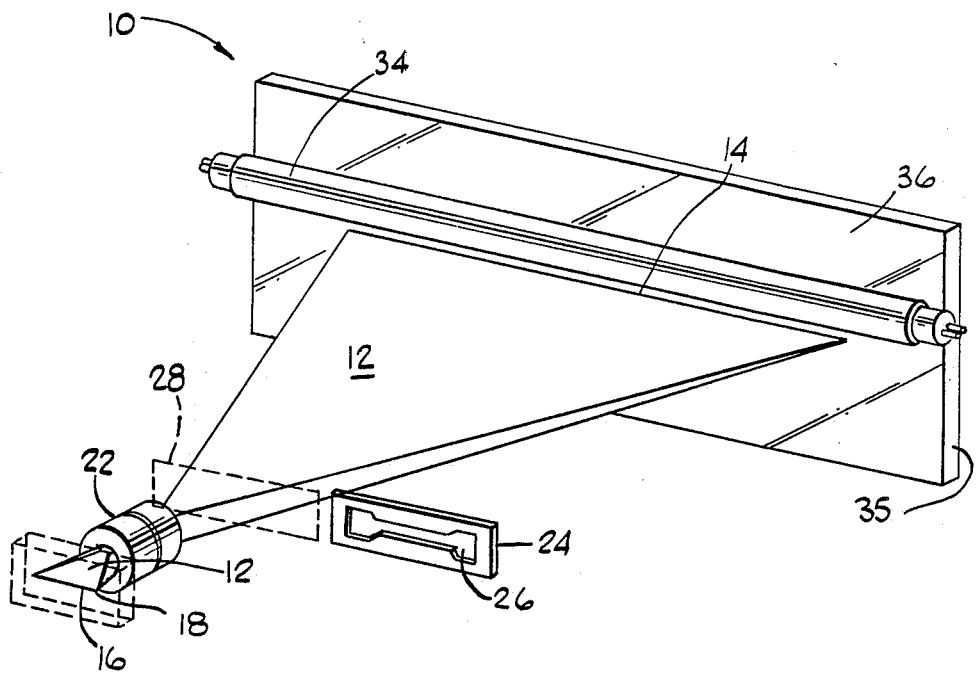
FIG. 1 is a schematic perspective view of a line-focus system.

As illustrated with reference to FIG. 1, the present invention, in general, comprises a method for selecting the shape for an occluding aperture 24 which is to be positioned at a predetermined aperture location 28 in a light path 12 extending between an illuminated line object 14 and a linear photosensor array 16. Through use of the aperture selected according to the method, a light intensity measurement is obtained across the linear photosensor array 16 which is uniformly proportional to the light intensity across the illuminated line object 14.

Initially, a constant light intensity is provided across the illuminated line object 14 and the resulting light intensity, with no aperture present in the light path, is measured at the linear photosensor array 16. Next, a constant value, target light intensity which is to be achieved through use of the aperture is selected. The selected target light intensity is preferably equal to approximately the lowest light intensity value associated with the illuminated line object which was measured across the linear photosensor array.

Figure 11:
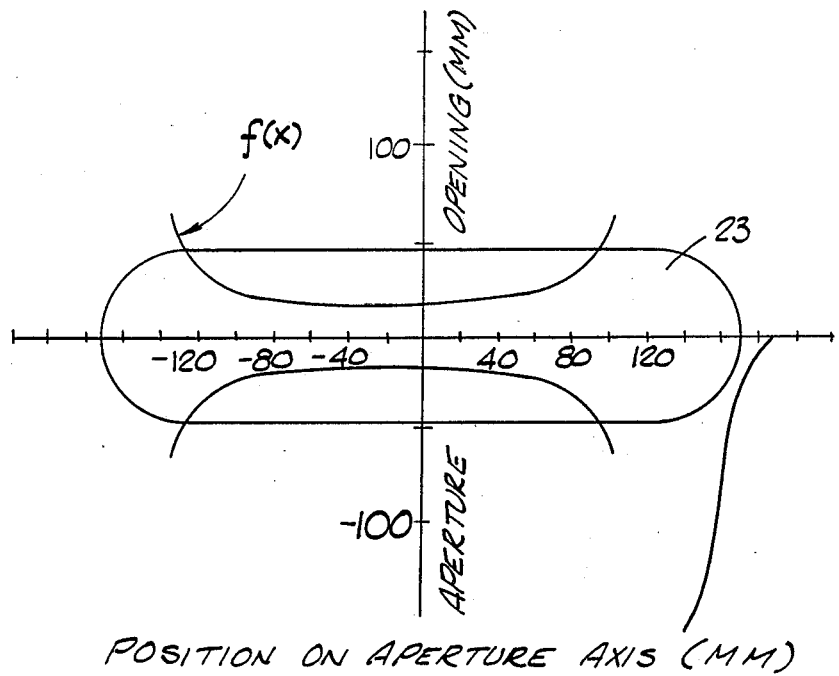
FIG. 11 is a graphic illustration of the mathematical representation of aperture shape in an initial guess at aperture shape.

Next, an initial aperture shape 23, FIG. 11, is selected and is represented mathematically. A mathematical model for light intensity at any point across the linear photosensor array is then constructed. The mathematical model assumes an aperture of the selected shape in place at the predetermined aperture location 28 and assumes a light intensity at the line object 14 equal to that produced at line object 14 for the initial light intensity measurement at the photosensor 18.

Next, using the measured light intensity across the photosensor array 16 and the mathematical model, the light intensity across the photosensor array 16 with the selected aperture shape in place is computed.

Next, during a selected number of iterations, the mathematical expression for aperture shape in the mathematical model for light intensity is manipulated in an orderly fashion which is adapted to minimize the total deviation of the computed light intensity across the linear photosensor array from the constant value, target light intensity.

Finally, an aperture shape 26, FIGS. 1–3 and 12, is selected in accordance with the particular manipulated mathematical expression for aperture shape which produces the least total deviation in computed light intensity from the constant value, target light intensity.

Having thus described the method of the invention in general, apparatus used in practicing the method and further details of the method will now be described.

Line Focus System Components

Figure 4:
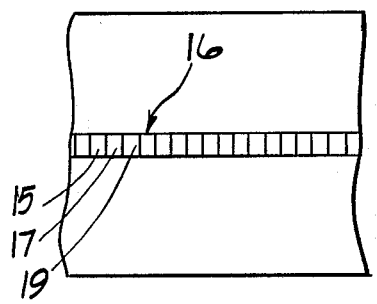
FIG. 4 is a detail plan view of a linear photosensor array.

FIG. 1 illustrates a line-focus system 10 having a light path 12 extending between an illuminated line object 14 and a linear photosensor array 16. A line image 18 of the illuminated line object 14 is projected onto the linear photosensor array 16 by a lens assembly 22. The linear photosensor array 16 as illustrated in the detail view of FIG. 4 comprises a plurality of linearly aligned photoelements 15, 17, 19, etc., which correspond to pixel locations on line object 14. Each photoelement produces a signal proportionate to the intensity of light which it receives. Linear photosensors are well-known in the art.

An aperture member 24 having an aperture opening 26 which a shape determined by mathematical modeling is adapted to be positioned at a predetermined aperture location 28 along the light path 12. The aperture member 24 is designed to partially occlude light in light path 12 to provide a light intensity across sensor 16 which is uniformly proportional to light intensity of the illuminated line object 14.

In the embodiment illustrated in FIG. 1, an illumination device such as fluorescent bulb 34 provides light which is reflected from an object 35 having a white, planar forward surface 36. The position and length of line object 14 on surface 36 is defined by the position and optical characteristics of an imaging lens 22 and by the length of linear photosensor array 16.

Characteristics of Uncompensated Light in a Line-Focus System

Figure 2:
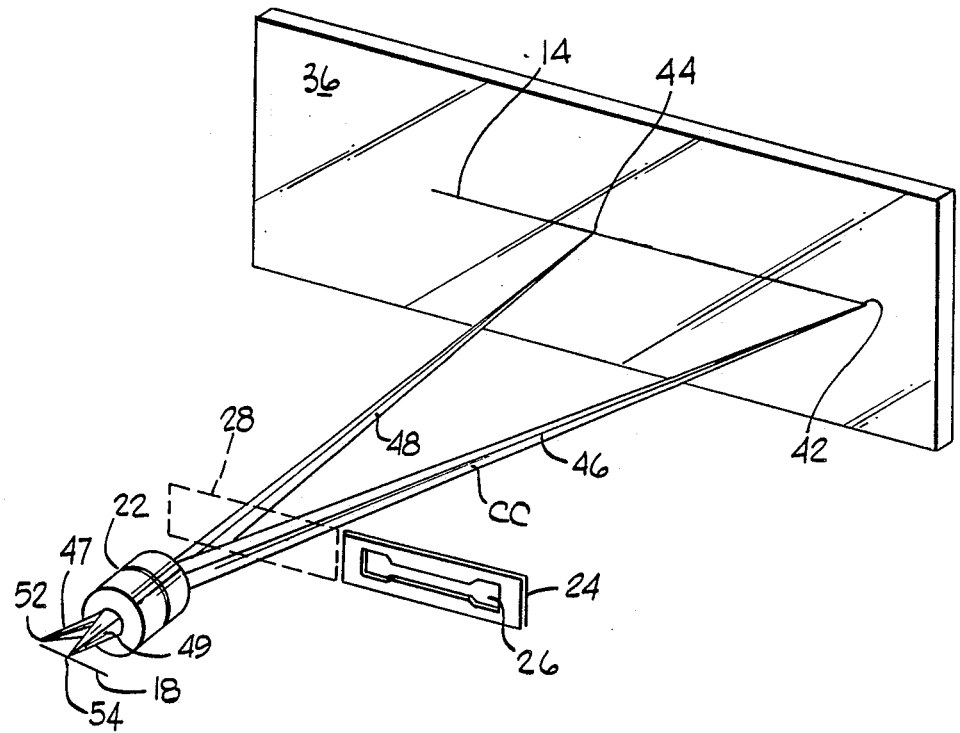
FIG. 2 is a schematic perspective view illustrating light cones associated with two light points in a line-focus system.
Figure 3:
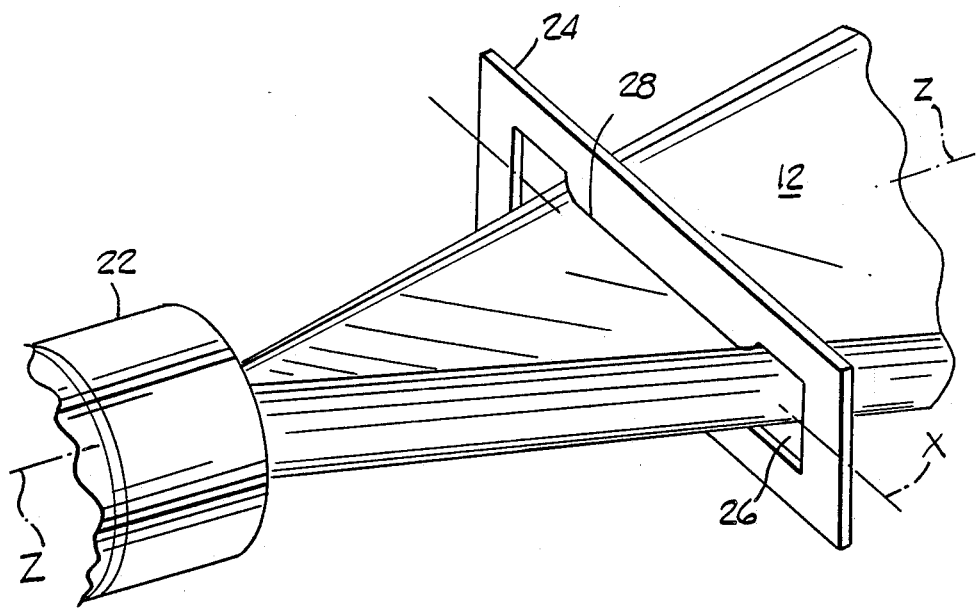
FIG. 3 is a perspective view of the line-focus system of FIG. 1 with an occluding aperture in place in the light path.
Figure 5:
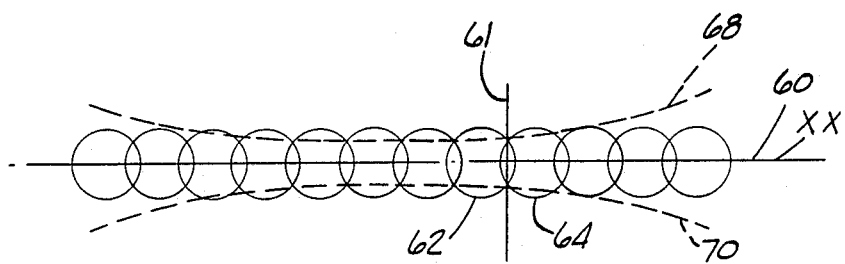
FIG. 5 is a schematic cross-sectional view of overlapping light cones in the plane of an occluding aperture.

Component portions of light in light path 12 may be imagined, for purposes of explanation, as illustrated in FIG. 2. Light rays emanating from an end point 42 of illuminated line object 14 which pass through the clear aperture of lens 22 form a diverging, generally conically-shaped bundle 46. The light rays in light cone 46, after passing through lens assembly 22, form a second cone 47 which converges at image point 52. Similarly, light from a central point on line object 14 forms a generally conical light bundle 48 which, after passing through the clear aperture of lens assembly 22, converges, as illustrated at 49, into image line light point 54. Since line object 14 has an infinite number of light points, it will be appreciated that the light path 12 comprises an infinite number of overlapping light cones. A typical aperture placement in light path 12 is illustrated in FIG. 3. The central longitudinal axis XX of the aperture opening 26 is positioned coplanar with the central plane 60 of the light path and perpendicular to the lens and light path central longitudinal axes as represented by ZZ. The overlapping of projected circle portion of light cones which occurs at aperture 24 is illustrated schematically in FIG. 5. Any region, e.g. 61, along the aperture axis XX necessarily occludes light from many different overlapping light circles, e.g. 62, 64, etc. (In FIG. 5, only a very small number of the nearly infinite number of overlapping light circles have been shown.) FIG. 5 also illustrates the general shape of the aperture opening 26. It is known from applicant's past design experience that the aperture opening must be generally "bow-tie" shaped in order to proportionately occlude more light at the center and less light at the ends of the light path. It is also known that, due to the symmetry of the light path, an aperture opening having mirror-image upper and lower peripheries 68, 70, respectively, is required. However, the fact that each point along the aperture axis XX occludes many different light cone projection circles has, until the present invention, prevented aperture designers from utilizing mathematical methods to determine aperture shape.

Measurement of Uncompensated Light Intensity

Figure 10:
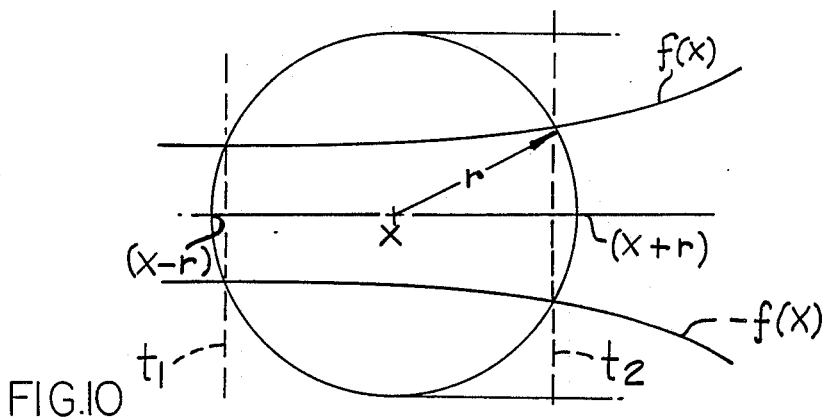
FIG. 10 is a detail view of a portion of FIG. 9 association with a particular light cone.

In accordance with the method of the present invention, initially a constant light intensity is provided across the illuminated line object. In a typical application in a line focus system such as illustrated in FIG. 10, a constant intensity line object is provided simply through providing a constant intensity light source 34 which reflects light from a white background such as the surface 36 of object 35. Alternately, a white background may be provided as by placing a white sheet of paper against surface 36 in the area where "scan line" or illuminated line object 14 is produced.

Figure 6:
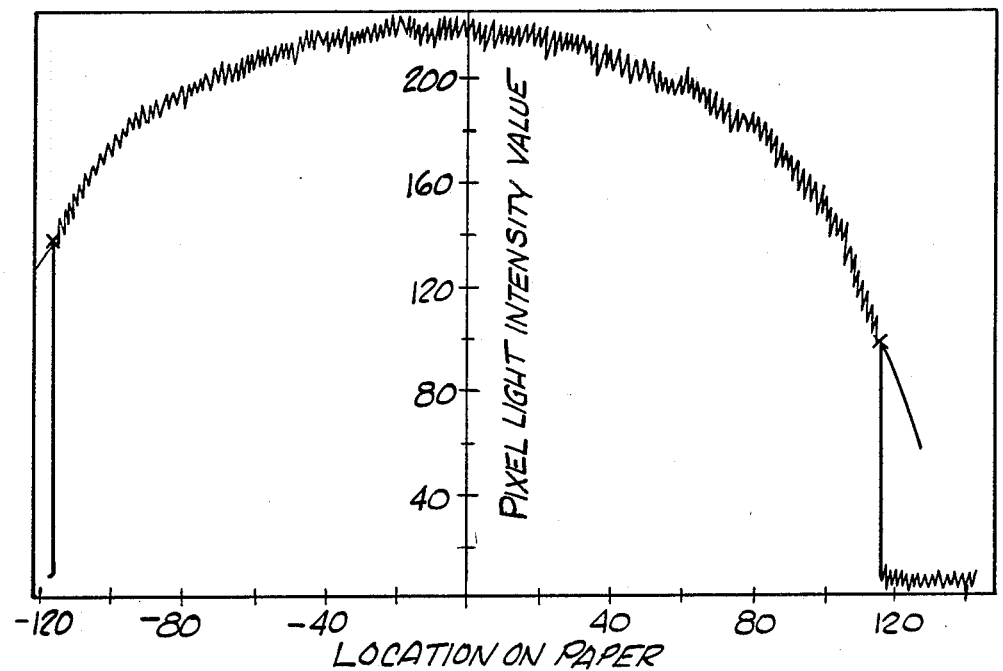
FIG. 6 is a graph representing measured light intensity in a line-focus system having no occluding aperture.

Next, with no aperture 24 in place in the light path 12, the light intensity across the linear photosensor array 16 is measured. A typical measurement of light intensity across the photosensor array is illustrated in FIG. 6. The units on the horizontal axis are representative of the position of points or "pixels" on the line object since each element in the photosensor array is associated with a point (actually, a small area region) on the line object. The units for the pixel light intensity value are irrelevant for the purposes of the present method and may be any unit which the measurement system provides.

Mathematical Representation of Measured Light Intensity

Since a single line object of moderate length, e.g. 240 mm is typically represented by several thousand data points, e.g. 4000 data points, it is generally desirable to find a simpler characterization of light intensity so that the intensity of any given location may be determined without examining a cumbersome amount of data. Such a simper characterization of the light intensity data may be achieved through use of a polynomial curve fit to the data points. It has been determined by applicant that, typically, a fourth order polynomial provides a relatively good curve fit for such data. Fitting of polynomials to data is a well-known and commonly-used technique. Polynomial curve-fitting is described in *Advanced Engineering Mathematics,* 3rd Edition, of Erwin Kreyszig, published by John Wiley and Sons, Inc., of New York, N.Y., Library of Congress Catalog No. 71-172951, at Section 18.11, which is hereby specifically incorporated by reference for all that is disclosed therein.

Using such a polynomial curve-fitting technique, the data of FIG. 6 may be represented by the expression:

$$I(x) = 227 - 0.024436x - 0.00203943x^2 - 1.03113682*10^{-5}x^3 - 3.81489449*10^{-7}x^4 \quad \text{(Equation No. 1)}$$

Figure 7:
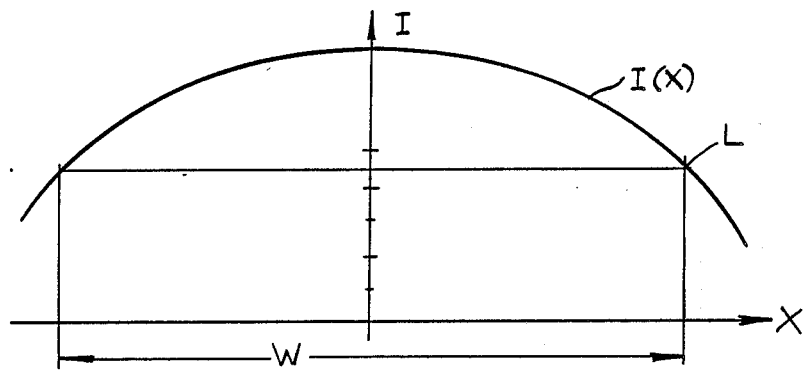
FIG. 7 is a graphic illustrating of a polynomial approximation for the data of FIG. 6.

This mathematical expression of light intensity, $I(x)$ versus line object position, $x$, along a line object having a length $w$ is illustrated in FIG. 7.

This characterization for light intensity at any point $x$ along the line object axis is used in the procedure for optimizing aperture shape described below.

Selection of Target Compensated Light Intensity

It is next necessary to choose an arbitrary level of light which is to be uniformly provided across the light path 12 with an "ideal" aperture in place. This arbitrary level of light which is to be achieved with an ideal aperture is sometimes referred to herein as "target compensated light intensity." In a preferred method of the invention, the arbitrary level of light which is selected is the lowest light intensity measurement associated with the line object. This is usually the light intensity associated with one of the end points of the line object 14 and is represented at "L" in FIG. 7. In the units of FIG. 7, the target light intensity has a value of 130. Thus, in the illustrated example:

$$L = 130 \quad \text{(Equation No. 2)}.$$

Mathematical Modeling of Compensated Light Intensity

As described above, each light cone, e.g. 46, 48, is a bundle of light rays which emanates from a point on line object 14 and which diverges as it approaches the lens 22. Each light bundle is redirected by the lens so that it converges at a point on the sensor.

The aperture 24 will eventually obstruct some of the rays in each cone, but the remaining rays in each cone are all redirected back to a point on the sensor 18. It should be noted that the light intensity at the sensor is affected, but not the field of view of the sensor. The aperture 24 does not obstruct any of the points on the line object 14 which are "seen" by the sensor. Rather, it differentially obstructs part of the light from each of these points.

As previously mentioned, there are an infinite number of light cones whose projected circles at the plane of the aperture 24 overlap considerably. It is not possible to obstruct the light from one point on the line object 14 without affecting the light from many other nearby points. (Fortunately for aperture design purposes, adjacent points on the line object 14 require their light intensities to be reduced by similar amounts.)

Figure 8:
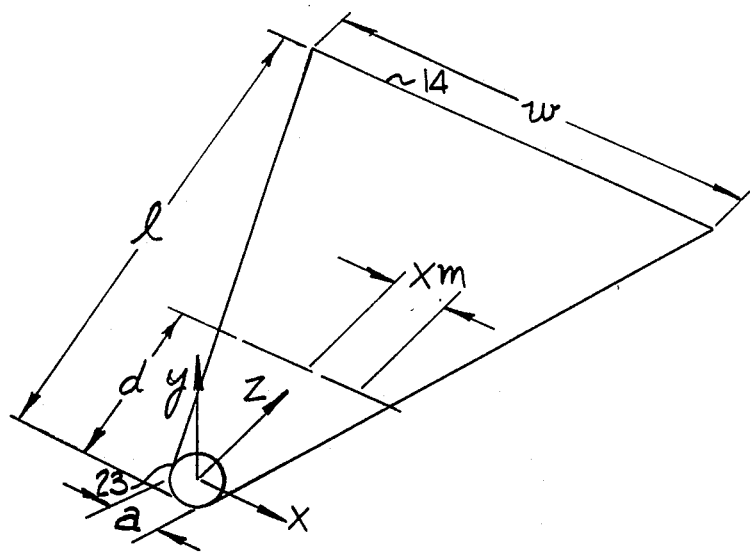
FIG. 8 is a schematic perspective view of the central plane of a light path showing certain parameters of a line-focus system.

In order to optimize an aperture shape, it is necessary to model how a particular shape interacts with the light cones to affect the intensity at the sensor 16. FIG. 8 defines some coordinates and distances which will enter into the mathematical model:

a = clear aperture diameter of lens
l = distance from line object to lens aperture d = distance from lens aperture to occluding aperture location 28

$x_m$ = distance from centerline of optical path to centerline CC of outside cone 46.

Figure 9:
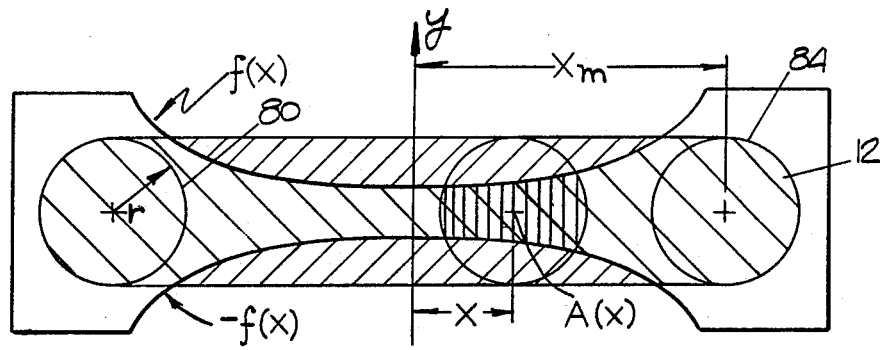
FIG. 9 is an elevation view of an occluding aperture in place in the light path of a line-focus system.

FIG. 9 shows, in dashed lines, a cross-section of light path 12 at the aperture stop location. The cones of light, as mentioned earlier, project approximately as circles on the plane of the aperture stop. (Actually, the cones become slightly elliptical away from the center of the light path, but this is a minor effect and may be ignored with satisfactory results.)

These projected circles have a radius equal to half the thickness of the light path 12, with that thickness dependent on the placement of the aperture and the system geometry, as well as the lens aperture size. A circle at location x along the aperture axis represents the light bundle from a particular point x(l/d) on the line object 14, the intensity of which is I(x*l/d) when unobstructed.

With the aperture 24 in place at 28, that intensity will be reduced in proportion to the area of the circle obstructed by the stop. (Actually, this is also an approximation because the light density in the bundle of rays is not constant. However, it is close enough that the variation is negligible.) The resulting light intensity is then the ratio of the unobstructed circle area to the total circle area multiplied by the original light intensity, or:

$$i(x) = I\left[x\left(\frac{l}{d}\right)\right] \cdot \frac{A(x)}{\pi r^2},$$ (Equation No. 3)

where i(x) is the light intensity at any point x along the aperture axis; A(x) is the area of the unobstructed portion of the circle projected by a light cone centered at point x on the aperture axis; and r is the circle radius.

For the desired design condition i(x) = L for $|x| \leq x_m$, where $x_m$ is the distance from the center of the aperture to the outermost light cone central axis.

FIG. 10 is a detailed illustration showing variables relative to the calculation of area A(x) for an aperture shape represented by the functions f(x) and −f(x). Thus, the unobstructed circle area associated with a light cone centered at a point x on the aperture axis may be expressed as:

$$A(x) = 2\left[\int_{x-r}^{t_1}\left(\sqrt{r^2 - (x-t)^2}\right)dt + \int_{t_1}^{t_2} f(t)dt + \int_{t_2}^{x+r}\left(\sqrt{r^2 - (x-t)^2}\right)dt\right]$$ (Equation No. 4)

or alternately as:

$$A(x) = 2\int_{x-r}^{x+r} \min(f(t), \sqrt{r^2 - (x-t)^2})\,dt$$ (Equation No. 5)

It may be quite difficult to analytically compute the integral expression for A(x) given in equations 4 and 5 above. Thus, A(x) is preferably computed numerically once a specific function for f(x) is provided, as described below. Numerical integration is a straightforward concept, and several techniques are generally taught in a first calculus course. Numerical integration is described in *Kreyszig*, supra, at Section 18.5, which is hereby specifically incorporated by reference.

Thus, given any aperture shape expressed by the function f(x) and −f(x); the light intensity at the photosensor associated with any point x along the aperture axis may be represented by the mathematical expression:

$$i(x) = I\left[x\left(\frac{l}{d}\right)\right] \cdot \frac{2\int_{x-r}^{x+r} \min(f(t), \sqrt{r^2 - (x-t)^2})\,dt}{\pi r^2}$$ (Equation No. 6)

Other mathematical relationships which result from the system geometry illustrated in FIGS. 8 and 9 and which may be solved to obtain needed values of x and r in solving Equation Nos. 1 and 6 include:

$$x_m = \frac{w}{2}\left(\frac{d}{l}\right) = \frac{wd}{2l}$$ (Equation No. 7)

$$r = \frac{a}{2}\left(\frac{l-d}{l}\right) = \frac{a(l-d)}{2l}$$ (Equation No. 8)

Optimization of the Aperture Shape

The first step in arriving at the proper aperture shape is to determine the general form of f(x) and then make an educated guess at a specific shape that will be at least grossly similar to the final shape. Applicant is aware from past design experience that use of an eighth-order polynomial for f(x) will generally result in a final aperture shape which is sufficiently precise for most design purposes. Applicant is also aware that the aperture will be somewhat bow-tie-shaped, and the center opening of the aperture will be roughly half the thickness of the light path.

As an example, an aperture will be designed for a line-focus system 10 with the following system parameters:

a = 10.5    l = 360
d = 40      w = 224
I(x) from Equation 1    L = 130

A polynomial that will provide at least the proper gross shape for an aperture opening defined by f(x) and −f(x) is given by:

$$f(x) = 2 + 0.01x + 0.002x^2 + 0.0003x^3 +$$ (Equation No. 9)
$$0.00004x^4 + 0.000005x^5 + 0.0000006x^6 + 0.00000007x^7 +$$
$$0.000000008x^8.$$

This equation is simply an arbitrary choice based upon empirical data which suggests a bow-tie shape aperture with a middle portion about half as wide as the light path. Such an equation may be produced by data point polynomial curve-fitting techniques based upon a graphic "guess" at an aperture shape. Polynomial curve fitting techniques have been previously described.

FIG. 11 shows this aperture shape superimposed on the cross-section of the light path 12 at d=40.

This specific function of f(x) is then substituted into Equation No. 6. Equation No. 6 is then solved, preferably by numerical methods, for several values of x across the aperture.

Thus, using the procedure described above, the light intensity at the aperture, i(x), may be calculated for several points across the aperture (preferably at least 20 equally spaced points). These values may then be compared with the desired light intensity "L" to see if i(x)=L. We can measure the "goodness" of this aperture shape by computing how much deviation i(x) has from the ideal value, "L". This can be computed as follows:

$$S = \Sigma[i(x) - L]^2 \qquad \text{(equation No. 10).}$$

Figure 13:
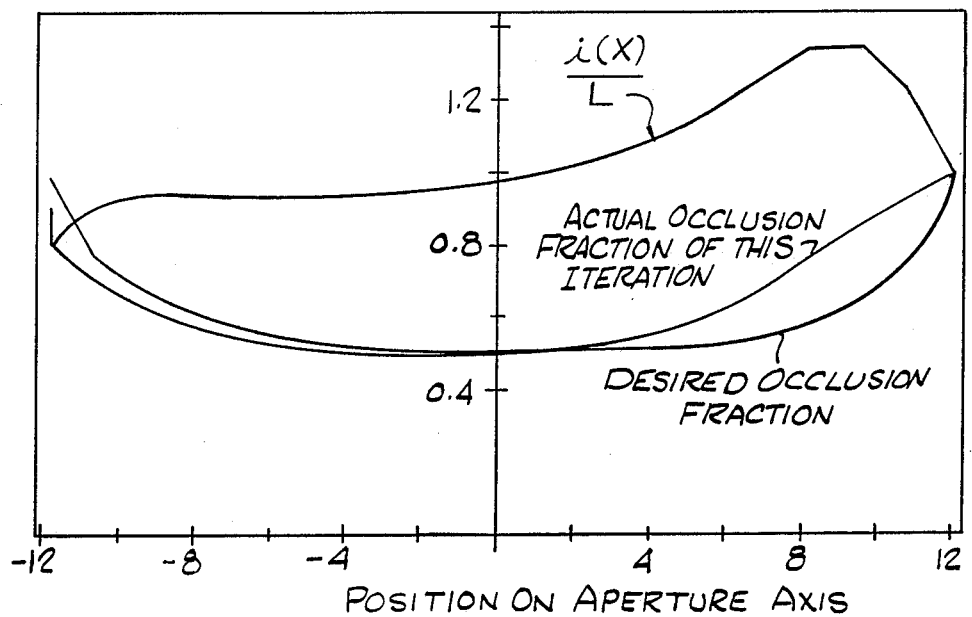
FIG. 13 is a graphic representation illustrating the relative accuracy of the aperture of FIG. 11 for its intended purpose.

FIG. 13 shows the result of this modeling using the set of coefficients from the polynomial equation for aperture shape of Equation No. 9. The optimization procedure then proceeds as follows:

Repeat these steps:

1. Model light intensity at aperture with current f(x) (i.e. solve Equation No. 6 for several representative points using a current specific f(x) such as Equation No. 9);
2. Compute total deviation S using Equation No. 10;
3. Adjust coefficients of f(x) to make S smaller until S is minimized.

One method which may be used for adjusting the coefficients of f(x) is called the simplex method. The simplex method is well-known and widely used among mathematicians. The simplex method is described in the May 1984 edition of BYTE magazine, at pp. 340–362, in an article entitled, "Fitting Curves to Data," by Marco S. Caceci and William P. Cacheris of Florida State University.

Figure 14:
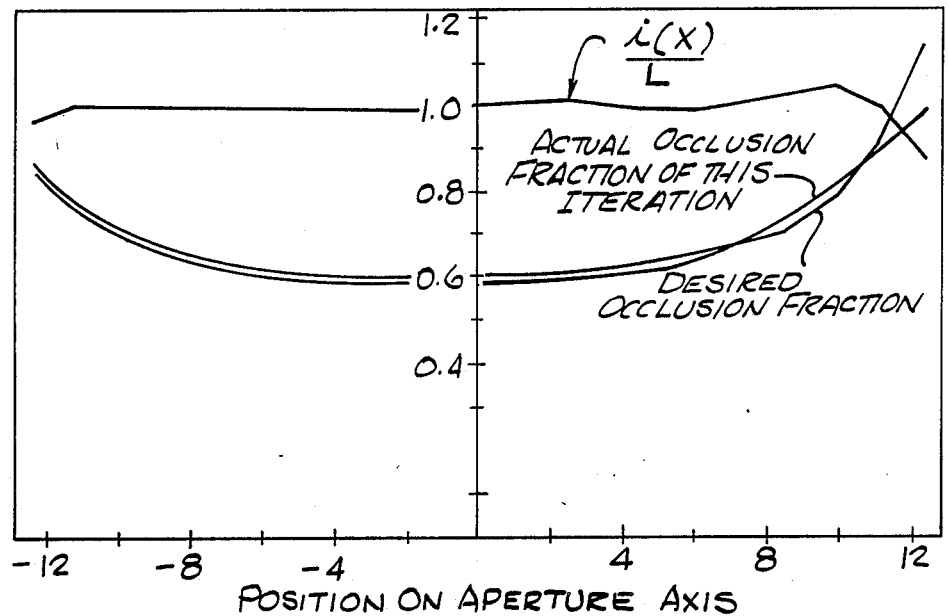
FIG. 14 is a graphic representation illustrating the relative accuracy of the aperture of FIG. 12 for its intended purpose.

After several hundred iterations of the above optimization loop using the simplex method for adjusting the coefficients of f(x) to minimize S, the optimal set of coefficients for an aperture opening 26 described by an eighth-order polynomial was achieved. FIG. 14 shows the resulting performance. It should be noted that the light intensity is still not perfectly flattened out. Because of overlap in the light cones, it may not be possible to construct a perfect aperture, but this result is about the closest which may be achieved with an eighth-order polynomial. A higher-order function might improve things slightly, but the improvement would probably not be significant.

Figure 12:
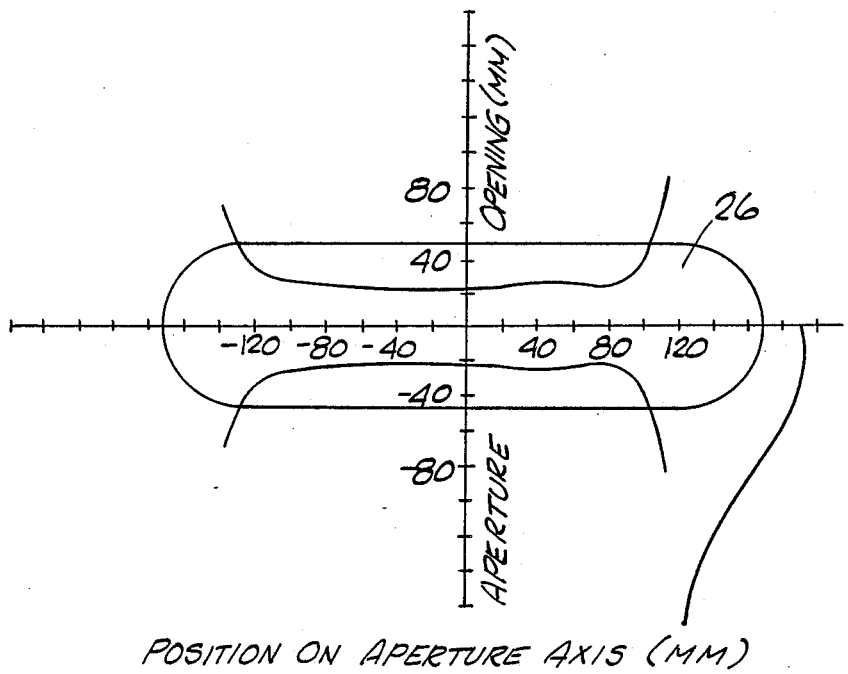
FIG. 12 is a graphic illustration of the mathematical representation of aperture shape for a particular line-focus system determined by use of the method of the present invention.

Finally, FIG. 12 shows the optimized aperture shape superimposed on the light path cross-section, utilizing the aperture shape of the iteration of FIG. 14 in which:

$$f(x) = 2.29 + 0.0439x + 0.0052084x^2 - \\ 0.00127523x^3 - 9.11383485 \cdot 10^{-5}x^4 - 1.1937164 \cdot 10^{-5}x^5 - \\ 1.129698 \cdot 10^{-6}x^6 + 2.6567833 \cdot 10^{-7}x^7 + 2.41819433 \cdot 10^{-8}x^8$$

(Equation No. 11)

An aperture having an aperture shape defined by the f(x) and −f(x) of Equation No. 11 may be constructed using currently available CAD/CAM systems which are widely used and well-known in the art.

It will, of course, be appreciated that the shape of the aperture opening 26 at any point beyond the outer edge of the light path is irrelevant to aperture performance. Thus, the aperture has been "squared-off" at the ends in the illustrations of FIGS. 1–3 and 9.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method for selecting the shape of an occluding aperture which is to be positioned at a predetermined aperture location in a light path extending between an illuminated line object and a linear photosensor array whereby, through use of the aperture, a light intensity measurement is obtained across the linear photosensor array which is uniformly proportional to the light intensity across the illuminated line object, comprising the steps of:

(a) providing a constant light intensity across the illuminated line object during a testing period;
(b) measuring the light intensity across the linear photosensor array during the testing period without an occluding aperture in the light path;
(c) selecting a target, constant value light intensity which is to be achieved through use of occluding aperture;
(d) selecting an initial aperture shape and representing the selected shape mathematically;
(e) constructing a mathematical model for the light intensity at any point across the linear photosensor array, with an aperture of the selected shape in place at the predetermined aperture location;
(f) using the light intensity measured across the photosensor array during the testing period and the mathematical model to compute the light intensity across the photosensor array with an aperture of the selected shape in place;
(g) during a selected number of iterations, adjusting the mathematical expression representative of aperture shape in an orderly fashion adapted to minimize the total deviation of the computed light intensity across the linear photosensor array from the target constant value light intensity;
(h) selecting a final design aperture shape in accordance with the one of the adjusted mathematical expressions for aperture shape which produces the least total deviation in computed light intensity from the target constant value light intensity.

2. The invention of claim 1 wherein the step of selecting a target constant value light intensity comprises selecting a value which is no greater than approximately the lowest light intensity value associated with the illuminated line object which was measured across the linear photosensor array during the testing period.

3. The invention of claim 1 wherein the step of representing a selected aperture shape mathematically comprises representing aperture shape as a polynomial expression.

4. The invention of claim 3 wherein the step of adjusting the mathematical expression representative of aperture shape comprises adjusting the coefficients of the polynomial expression for aperture shape.

5. The invention of claim 4 wherein the step of adjusting the coefficients of the polynomial expression for aperture shape comprises using the simplex method.

6. The invention of claim 1 wherein the step of computing the light intensity across the photosensor array with an aperture of the selected shape in place comprises using numeric integration.

7. The invention of claim 1 comprising the further step of representing the light intensity measured across the linear photosensor array during the testing period as a polynomial expression.

8. The invention of claim 1 wherein the constructed mathematical model for light intensity across the photosensor array with an aperture in place is expressed as a variable fraction of the light intensity measured during the testing period without an aperture in place.

9. The invention of claim 8 comprising representing the variable fraction with a numerator comprising a mathematical expression for the unobstructed projected area of a light cone centered at a point along the axis of the aperture and with a denominator comprising a mathematical expression for the total projected area of that light cone.

10. A method for selecting the shape of an occluding aperture which is to be positioned at a predetermined aperture location in a light path extending between an illuminated line object and a linear photosensor array whereby, through use of the aperture, a light intensity measurement is obtained across the linear photosensor array which is uniformly proportional to the light intensity across the illuminated line object, comprising the steps of:

(a) providing a constant light intensity across the illuminated line object during a testing period;

(b) measuring the light intensity across the linear photosensor array during the testing period without an occluding aperture in the light path;

(c) selecting a target, constant value light intensity which is to be achieved through use of occluding aperture which value is no greater than approximately the lowest light intensity value associated with the illuminated line object which was measured across the linear photosensor array during the testing period;

(d) selecting an initial aperture shape and representing the selected shape mathematically as a polynomial equation;

(e) constructing a mathematical model for the light intensity at any point across the linear photosensor array, with an aperture of the selected shape in place at the predetermined aperture location;

(f) using the light intensity measured across the photosensor array during the testing period and the mathematical model to compute the light intensity across the photosensor array with an aperture of the selected shape in place;

(g) during a selected number of iterations, adjusting the coefficients of the polynomial equation representative of aperture shape in an orderly fashion adapted to minimize the total deviation of the computed light intensity across the linear photosensor array from the target constant value light intensity;

(h) selecting a final design aperture shape in accordance with the one of the coefficient-adjusted, polynomial expressions for aperture shape which produces the least total deviation in computed light intensity from the target constant value light intensity.

* * * * *